United States Patent
Nimmons

(10) Patent No.: US 6,800,829 B1
(45) Date of Patent: Oct. 5, 2004

(54) METHOD AND APPARATUS FOR REPAIRING AIR-COOLED AIRFOILS

(75) Inventor: Francis Edward Nimmons, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/250,026

(22) Filed: May 29, 2003

(51) Int. Cl.$^7$ .............................. B23H 9/14; B23H 5/00; B26F 3/00

(52) U.S. Cl. ................... 219/69.17; 29/889.1; 83/177; 219/69.11; 219/69.14

(58) Field of Search ......................... 29/889.1, 889.721; 219/69.11, 69.14, 69.17, 69.2; 700/162; 83/53, 177; 451/38

(56) References Cited

U.S. PATENT DOCUMENTS

| | | | |
|---|---|---|---|
| 4,414,456 A | * | 11/1983 | Inoue .......................... 205/662 |
| 4,992,639 A | * | 2/1991 | Watkins et al. ............ 219/69.2 |
| 6,222,155 B1 | * | 4/2001 | Blackmon et al. ..... 219/121.39 |
| 2004/0064930 A1 | * | 4/2004 | Gunn et al. ................. 29/451.1 |

FOREIGN PATENT DOCUMENTS

| | | |
|---|---|---|
| EP | 1148208 A2 | * 10/2001 |
| JP | 62-120960 A | * 6/1987 |

* cited by examiner

Primary Examiner—Geoffrey S. Evans
(74) Attorney, Agent, or Firm—Ernest Cusick; Gary M. Hartman; Domenica N.S. Hartman

(57) ABSTRACT

Method and apparatus for repairing an article, such as an air-cooled component, during which at least a portion of the component must be removed and replaced. The method and apparatus make use of one or more workpiece holders adapted to secure and position an component on the apparatus, a multi-axis head adapted for movement relative to the workpiece holder, a nozzle mounted to the multi-axis head and operable to remove at least a portion of the component with a jet of fluid discharged therefrom, an electrical-discharge electrode mounted to the multi-axis head and operable to form surface holes in the component by electrical-discharge machining, and a system for controlling the movement of the multi-axis head so that the waterjet and electrical-discharge machining operations are performed to yield a repaired component that closely duplicates the original.

30 Claims, 3 Drawing Sheets

METHOD AND APPARATUS FOR REPAIRING AIR-COOLED AIRFOILS

BACKGROUND OF INVENTION

1. Field of the Invention

The present invention generally relates to machining equipment and processes. More particularly, this invention relates to a method and apparatus that combines a fluid-jet system and an electrical-discharge machining (EDM) system for use in the repair of air-cooled airfoil components of gas turbine engines.

2. Description of the Related Art

Components located in the high temperature sections of gas turbine engines are typically formed of superalloys. Such components, which include combustors and turbine nozzles (vanes) and buckets (blades), are under strenuous high temperature conditions during engine operation, which can lead to various types of damage or deterioration. For example, erosion, cracks and other surface discontinuities tend to develop at the trailing edges of airfoils (e.g., buckets and nozzles) during service due to foreign object impact (foreign object damage, or FOD).

Because the material and processing costs of superalloys are relatively high, repair of damaged or worn superalloy components is typically preferred over replacement. For this purpose, weld repair methods have been developed using tungsten inert gas (TIG) and other welding processes.

The first and second stage power nozzles of industrial gas turbine engines are notably prone to damage caused by impact with foreign objects. For purposes of discussion, a section of a nozzle segment 50 is represented in FIG. 1, in which multiple nozzle partitions 52 are supported between a pair of bands 54. In a typical repair process, the nozzle segment 50 is removed and then undergoes repair by hand. The damaged area of the nozzle segment 50 may be a small surface region of the segment 50, such as the trailing edge 58 of a partition 52, or encompass a much larger area. If the former, the damaged area can be selectively removed by grinding using a high speed grinder with a burr attachment, while the latter may require removal of an entire partition 52 using a high speed grinder with an abrasive cutting disc. Each of these operations is labor-intensive, often requiring about four man-hours or more. After removal of the damaged area, the repair process is completed by welding and grinding. If a partial partition 52 has been removed, a replacement may be welded in its place. Smaller surface areas are repaired by TIG welding to build up a weldment that replaces the removed material. The welding process is followed by grinding in order to closely duplicate the original contours (e.g., suction and pressure surfaces) of the partition 52.

Weld repairs of air-cooled turbine components, such as the partitions 52 of FIG. 1, are further complicated by the presence of cooling holes 60, which are typically formed at the trailing edge 58 by such drilling techniques as electrical-discharge machining (EDM) and laser machining. During welding, cooling holes 60 in the surfaces of a nozzle partition 52 are susceptible to blockage by weld filler material that enters the holes 60. The performance of a partition is directly related to the ability to provide uniform cooling of its surfaces with a limited amount of cooling air. In particular, the size and shape of each hole 60 determine the amount of air flow exiting the hole 60 and the distribution of the air flow across the downstream surface of the partition 52, and also affect the overall flow distribution within the cooling circuit containing the hole 60. Consequently, it is important that the cooling holes 60 in a weld-repaired partition are substantially restored to their original size, shape and location. Methods for reestablishing cooling holes or blocking existing cooling holes are known, such as through the use of carbon rods. However, this technique challenges the welder in retaining the integrity of the weld around the carbon rod, and often requires rework.

In view of the above, it can be seen that the removal and repair of a gas turbine airfoil component is labor-intensive, particularly with the added demand that the contours and cooling holes of the repair closely duplicate that of the original component. While various other approaches have been proposed for repairing nozzle partitions, such as in commonly-assigned U.S. Pat. No. 5,895,205 to Werner et al., there is an ongoing effort to develop improved repair methods.

SUMMARY OF INVENTION

The present invention provides a method and apparatus for repairing an article, and particularly an air-cooled airfoil, during which at least a portion of the airfoil must be removed and replaced. The method and apparatus make use of a combined fluid-jet system and an electrical-discharge machining (EDM) system that enables the contours and cooling holes of a repaired airfoil to closely duplicate that of the original.

The apparatus of this invention includes at least one workpiece holder adapted to position and secure an airfoil on the apparatus, a multi-axis head adapted for movement relative to an airfoil positioned and secured on the apparatus, a nozzle mounted to the multi-axis head and operable to remove at least a portion of the airfoil with a jet of fluid discharged therefrom, an electrical-discharge electrode mounted to the multi-axis head and operable to form surface holes in the airfoil by electrical-discharge machining, and means for controlling the movement of the multi-axis head. More particularly, the controlling means is operable to precisely position and move the nozzle relative to surface contours of the airfoil when removing the portion of the airfoil, and to precisely position and move the electrical-discharge electrode relative to surface contours of the airfoil when forming the surface holes in the airfoil.

The above-described apparatus makes possible a method of repairing an air-cooled airfoil by positioning the airfoil on the apparatus, operating the multi-axis head to remove at least a portion of the airfoil by cutting the airfoil with a jet of fluid discharged from the nozzle mounted to the multi-axis head, removing the airfoil from the apparatus, welding the airfoil to form a replacement section that replaces the portion removed from the airfoil, positioning and securing the airfoil to the apparatus with a workpiece holder, and then operating the multi-axis head to form surface holes in the replacement section of the airfoil by electrical-discharge machining the replacement section with an electrical-discharge electrode mounted to the multi-axis head.

In view of the above, the apparatus and method of the present invention are able to improve the productivity, quality and safety of the operation of repairing an air-cooled airfoil by combining equipment for two separate cutting operations on a single multi-axis head that is configured and controlled to be highly and precisely maneuverable. Use of a multi-axis head enables movement of both the fluid-jet nozzle and the electrical-discharge electrode to be controlled so as to precisely position and move the nozzle relative to surface contours of the airfoil when removing the portion of the airfoil, and later to precisely position and move the electrical-discharge electrode relative to surface contours of the airfoil when forming the surface holes in the repaired airfoil, based on contour data that can be stored by the apparatus.

Other objects and advantages of this invention will be better appreciated from the following detailed description.

DETAILED DESCRIPTION

Figure 1:
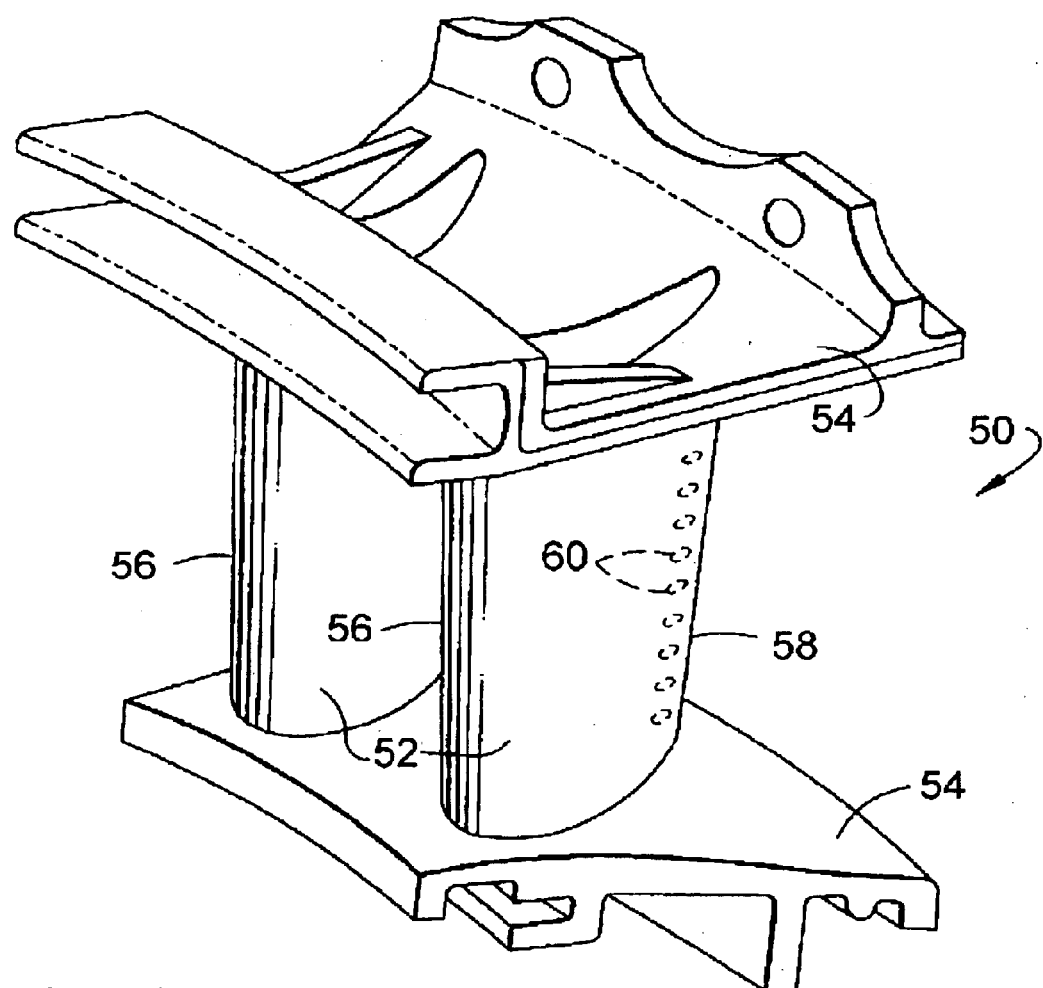
FIG. 1 represents a section of a nozzle segment of an industrial gas turbine engine.
Figure 2:
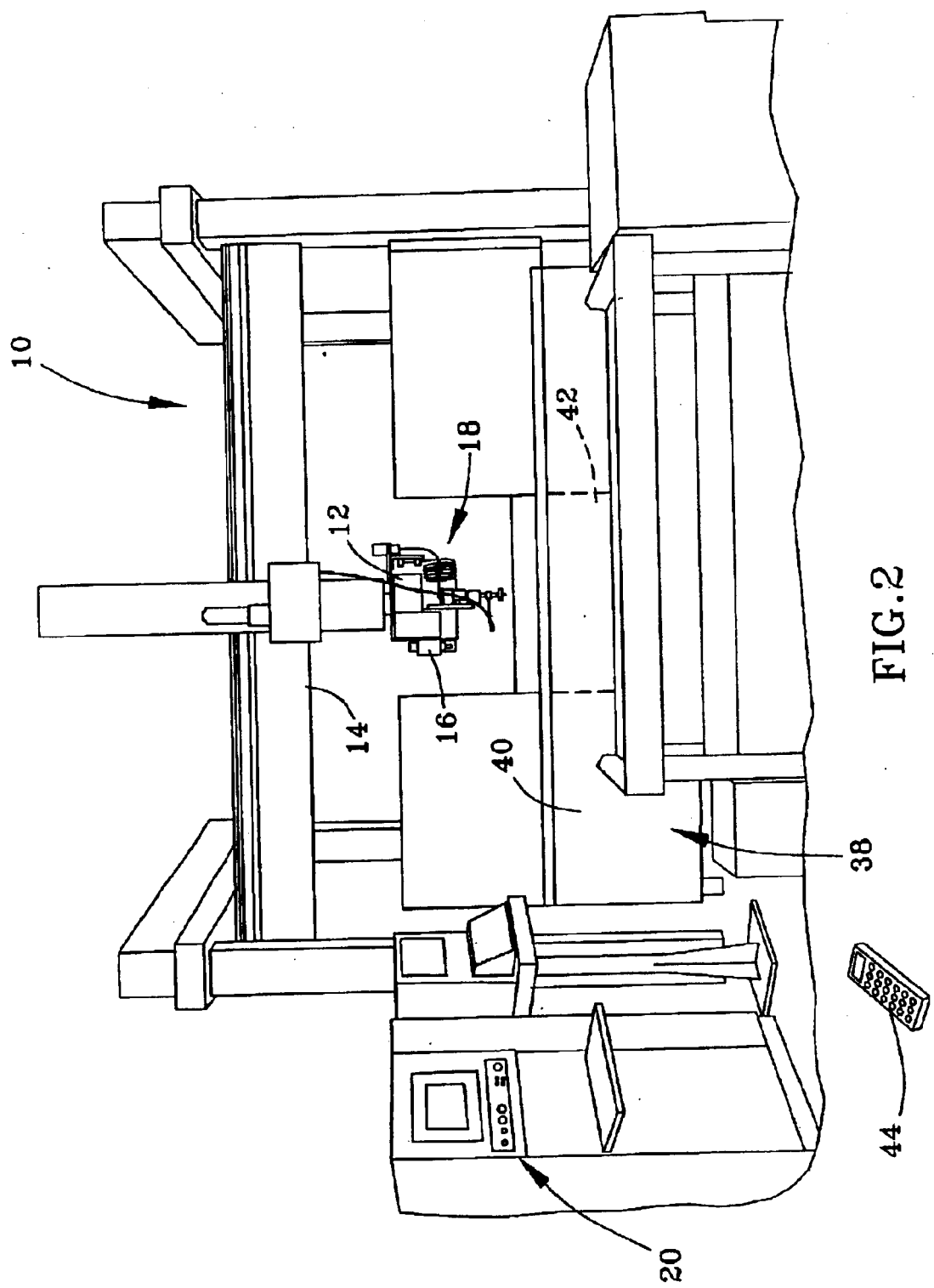
FIG. 2 is a schematic elevational view of an apparatus that combines the functionalities of an EDM and waterjet in accordance with this invention.
Figure 3:
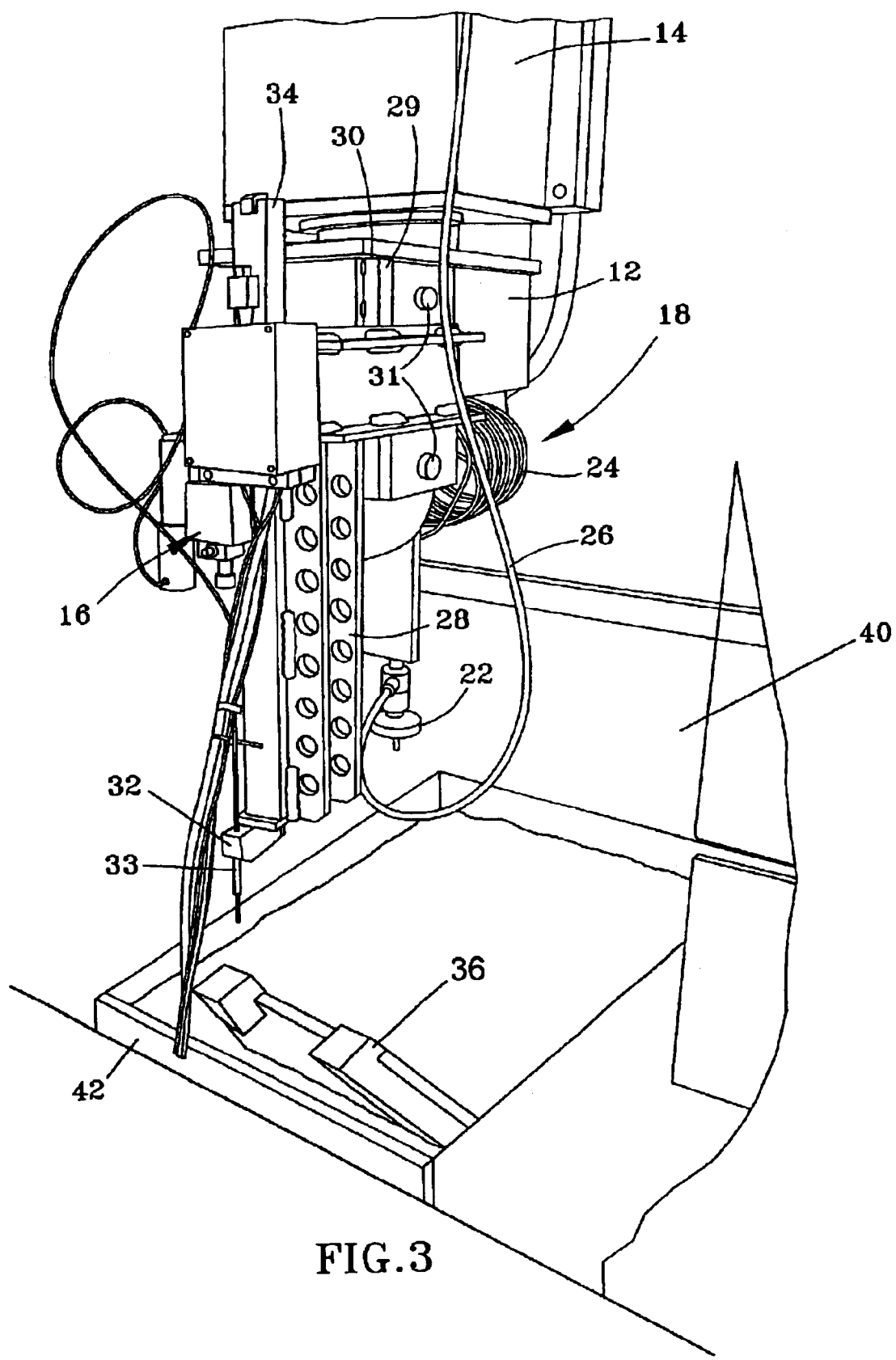
FIG. 3 is a more detailed schematic view of a multi-axis head of the apparatus of FIG. 2, on which an electrical-discharge electrode and waterjet nozzle are mounted in accordance with this invention.

Illustrated in FIGS. 2 and 3 is an apparatus 10 adapted to perform both waterjet and EDM machining operations on components, such as in the repair of an air-cooled airfoil to closely duplicate the contours and cooling holes of the original in accordance with a preferred aspect of this invention. While the apparatus 10 and the process performed by the apparatus 10 will be discussed in reference to repairing air-cooled nozzle partitions (such as the partitions 52 of FIG. 1), the apparatus 10 can be used to perform similar repair operations on other types of hardware, including various air-cooled components of other turbomachinery.

The apparatus 10 includes a multi-axis head 12 suspended from a gantry 14, and an EDM unit 16 and a waterjet unit 18 mounted to the head 12. Aside from the EDM unit 16 and its associated equipment and controls, the apparatus 10, including the head 12 and waterjet unit 18, can be of a type commercially available. More preferably, the apparatus 10 is a modified adaptation of a waterjet cutting system equipped with a five-axis waterjet head that is commercially available from PAR Systems under the name VectorÂ®. The PAR System waterjet cutting system provides a desirable and convenient foundation from the apparatus 10 of this invention can be built. Various features of this cutting system advantageously used in the apparatus 10 include a pressure capability of about 60,000 psi (about 4130 bar), a linear positioning accuracy of about +/−0.003 inch (about +/−75 micrometers), and the versatility of a five-axis positioning capability, which is particularly advantageous in view of the complex three-dimensional contours of airfoils. However, while the apparatus 10 is depicted in FIGS. 2 and 3 as being based on the PAR Systems waterjet cutting system, various other configurations are possible for the apparatus 10.

FIG. 2 shows the apparatus 10 as including a controller 20, which can be of a type provided with the PAR System waterjet cutting system, e.g., preferably PC-based with standard CNC programming capability to control the movement of the head 12 using absolute and relative point coordinate data. A single handheld remote pendant 44 is provided with which the movement of the multi-axis head 12 can be controlled by a single operator. The controller 20 preferably stores coordinate data for the particular airfoil (not shown) to be processed, so that the head 12 can be operated to precisely position the EDM unit 16, and optionally the water jet unit 18, relative to the surface contours of the airfoil.

The waterjet unit 18 shown in FIG. 3 includes a waterjet nozzle 22 mounted to the multi-axis head 12. The nozzle 22 can be of any suitable type capable of discharging a jet stream capable of cutting through the material of the airfoil, e.g., nickel-base and cobalt-base superalloys commercially-known under the names GTD-222 and FSX-414, respectively. A high-pressure fluid line 24 delivers water (or another suitable fluid) to the nozzle 22. A separate supply line 26 is provided for delivering to the nozzle 22 an abrasive media (e.g., garnet) of a type known and used to promote the cutting action of waterjets.

The EDM unit 16 is shown as being supported on a side of the multi-axis head 12 opposite the waterjet nozzle 22. As with the waterjet unit 18, the EDM unit 16 can be of a type commercially available. More preferably, the EDM unit 16 is adapted from an EDM electrode machine commercially available from Ann Arbor Machine, Inc. While a particular type and configuration for the EDM unit 16 is represented in FIG. 3, it is foreseeable that various other configurations and types could be used. In the repair of airfoils such as the nozzle segment 50 of FIG. 1, the EDM unit 16 is intended to restore the cooling holes in a weld-repaired section of the airfoil such that the contours and cooling holes of the repaired section closely duplicate that of the original airfoil. It is within the knowledge of those skilled in the art to appropriately identify operational parameters for the EDM unit 16 that render the unit 16 capable of quickly penetrating the airfoil material to consistently produce accurately-sized cooling holes without distorting the surrounding material.

FIG. 3 shows the EDM unit 16 as comprising an EDM head 28 modified to include a quick-position adapter plate 29. The adapter plate 29 is secured with two quick-snap bushing and plug sets 31 to a second adapter plate 30 bolted to the multi-axis head 12. The bushing and plug sets 31 enable the quick-position adapter plate to be quickly released from the adapter plate 30, so that the EDM head 28 can be can be readily removed from the head 12. As a result of the manner in which the quick-position adapter plate 29 is mounted, the head 28 generally has an inverted L-shape. An electrode guide 32 is mounted to the EDM head 28, with the lower end of the guide 32 projecting below the lower end of the head 28. The guide 32 can be of a conventional type for supporting one or more EDM electrodes 33. A power source 34 is shown mounted to an upper end of the head 28, by which voltage and current are supplied to the electrode 33. The electrode 33 may be formed of graphite or another suitable material (e.g., brass), and preferably has a cross-sectional shape corresponding to the desired shape of the cooling holes to be machined in the airfoil. With the multi-axis head 12, the electrode 33 can be precisely and repeatably positioned a specified distance from the surface of an airfoil to be machined, establishing a spark gap that is typically on the order of about 0.001 to about 0.003 inch (about 25 to about 75 micrometers).

The power source 34 is operated to cause a charge to build up on the electrode 33, which when sufficient causes an electrical current to jump the spark gap. Charge buildup and discharge is achieved by providing a suitable dielectric electrical-discharge medium between the electrode 33 and airfoil, such that material is removed from the airfoil by a sparking discharge action while the airfoil surface is being flushed with the medium. The medium can be delivered to the electrode-to-airfoil spark gap via appropriate plumbing through the center of the electrode 33 to the cutting contact surface. While oils have been widely used for this purpose, the present invention preferably makes use of partially deionized water. As used herein, partially deionized water has an electrical resistance that is greater than that of tap water, but less than that of pure distilled water. A preferred range for the electrical resistance of the water used with the present invention is about 1000 to about 1500 ohms per centimeter. According to commonly-assigned U.S. Pat. No. 6,489,582 to Roedl et al., partially deionized water is a desirable medium for the EDM machining of cooling holes in air-cooled airfoils because, in addition to cooling the airfoil and aiding in removing the residual material machined therefrom, water is less likely to plug the cooling holes in comparison to oil-base media. Using partially deionized water as the machining medium, suitable EDM machining results can be achieved with the apparatus 10 of this invention by operating the power source 34 to supply an applied voltage of about 480 VAC to about 40 VDC operational at the tip of the electrode 33 with an applied current capable of generating about 120 amperes.

In addition to its airfoil surface being flushed with partially deionized water, the nozzle segment is preferably immersed in a bath of partially deionized water during machining. For this purpose, FIG. 2 shows the apparatus 10 as including a catch tank system 38 comprising an EDM tank 42 within a larger tank 40, the latter of which collects spent water from the waterjet operation. As such, the tank 40 can generally be of a type conventionally used in waterjet cutting systems, such as the PAR System unit discussed above. The EDM tank 42 is preferably adapted to be placed within the larger tank 40 when needed for the EDM operation, so that the EDM head 28 can be positioned over the EDM tank 42, with a workpiece holder 36 (schematically represented in FIG. 3), nozzle segment, and lower end of the electrode 33 submersed in the EDM tank 42 so that partially deionized water within the tank 42 is present in the spark gap between the electrode 33 and the surface of the partition being machined. The EDM tank 42 collects the partially deionized water used in the EDM operation, and then delivers the collected water to a deionizing system (not shown) that supplies the EDM operation. The EDM tank 42 is preferably equipped with a float valve (not shown) for controlling the water level within the tank 42, and sensors (not shown) for monitoring the electrical resistance of the partially deionized water.

As discussed above, the apparatus 10 is particularly adapted to repair air-cooled nozzle segments of a gas turbine engine. The section of a nozzle segment 50 represented in FIG. 1 comprises multiple partitions 52 (airfoils), each of which is at last partially hollow, with cooling holes 60 present in the airfoil wall generally along the trailing edges 58 of the partitions 52. In service, cooling air is forced into the hollow interior of the partitions 52 and exits through the cooling holes 60, with the effect that the temperature of each partition 52 is minimized through a combination of heat transfer and film cooling. When repair of a partition 52 is necessary, the region most likely to need replacement is the airfoil trailing edge 58, encompassing the region in which the cooling holes 60 are present, though any surface region of a partition 52 may require repair, from the trailing edge 58 forward to the leading edge 56, and the suction and pressure surfaces therebetween.

Removal of a damaged portion of a partition is performed after the nozzle segment is removed from the turbomachine in which it is installed. The nozzle segment is placed on an appropriate support or fixture (e.g., a platform or a specially adapted workpiece holder similar to the holder 36 of FIG. 3) in the waterjet tank 40. The EDM tank 42 is preferably removed from the waterjet tank 40 for this part of the operation, so as to permit relatively conventional operation of the waterjet unit 18. The operator then controls the position of the waterjet nozzle 22 relative to the nozzle segment through the controller 20 and pendant 44. Depending on the particular application, the waterjet nozzle 22 is typically positioned about 0.25 to about 0.30 cm from the surface of the partition (or another region of the segment that requires repair), and then traversed across the surface of the partition to cut a preselected damaged region from the partition using waterjet parameters (e.g., pressure, jet diameter and traversal rate) appropriate for the partition (e.g., based on material, thickness, etc.). During this operation, the operator can use the pendant 44 to visually position the waterjet nozzle 22 relative to the surface being cut. Alternatively, the controller 20 could be used to control the movement of the multi-axis head 12 so that the waterjet nozzle 22 is precisely positioned and moved relative to the surface contours of the partition, based on the stored coordinate data of the nozzle 22.

Once the intended damaged region is removed (e.g., the trailing edge of the partition), the nozzle segment is removed from the apparatus 10 and undergoes a welding repair operation by which a replacement section is fabricated, such as by building up a weldment or welding a preformed insert in place. In either case, the welding operation preferably yields a replacement section that is as close as practical to the final aerodynamic shape desired for the partition, though additional grinding, etc., may be necessary for this purpose. However, the cooling holes having the appropriate shape and size required to achieve adequate air cooling of the partition cannot be readily produced or maintained during the welding repair operation. For this purpose, the nozzle segment is placed on the workpiece holder 36 of the EDM tank 42, which has now been positioned within the larger waterjet tank 40, and the multi-axis head 12 is operated with the pendant 44 and controller 20 to appropriately control the position and orientation of the electrode 33 relative to the surface of the partition before operating the EDM unit 16 to electrical-discharge machine the desired cooling holes in the replacement section of the partition. As previously noted, the EDM operation is performed while partially deionized water is present as the dielectric medium between the replacement section and the electrode 33. As with the waterjet cutting operation, the multi-axis head 12 is controlled during this step of the operation, though at this time the movement of the multi-axis head 12 is controlled to precisely position and move the electrode 33 relative to surface contours of the partition based on the stored coordinate data that precisely locates the surface of the partition relative to the electrode 33.

While the invention has been described in terms of a particular embodiment, it is apparent that other forms could be adopted by one skilled in the art. Therefore, the scope of the invention is to be limited only by the following claims.

What is claimed is:

1. A method of repairing a component with surface holes, the method comprising the steps of:

placing the component on an apparatus;

operating a multi-axis head of the apparatus to remove at least a portion of the component by cutting the component with a jet of fluid discharged from a nozzle mounted to the multi-axis head;

removing the component from the apparatus; welding the component to form a replacement section that replaces the portion removed from the component; placing the component on a workpiece holder of the apparatus; and then operating the multi-axis head to form surface holes in the replacement section of the component by electrical-discharge machining the replacement section with an electrical-discharge electrode mounted to the multi-axis head.

2. The method according to claim 1, wherein the apparatus is a fluid jet cutting apparatus and the method comprises modifying the multi-axis head of the apparatus to carry the electrical-discharge electrode in addition to the nozzle.

3. The method according to claim 2, wherein the modifying step comprises securing an adapter plate to the multi-axis head and then mounting the electrical-discharge electrode to the adapter plate.

4. The method according to claim 2, wherein as a result of the modifying step the nozzle and the electrical-discharge electrode are supported on oppositely-disposed sides of the multi-axis head.

5. The method according to claim 1, wherein the step of operating the multi-axis head to form surface holes further comprises providing water as a dielectric medium between the replacement section and the electrical-discharge electrode.

6. The method according to claim 5, wherein the water is delivered to the component from a first tank positioned within a second tank containing the fluid for the nozzle.

7. The method according to claim 6, wherein the first tank is removable from the second tank and is absent from the second tank during cutting of the component with the jet of fluid discharged from the nozzle.

8. The method according to claim 1, wherein the component is a gas turbine airfoil component.

9. The method according to claim 8, wherein the surface holes formed in the replacement section of the component are trailing edge cooling holes.

10. A method of repairing an air-cooled airfoil component of a turbomachine, the method comprising the steps of:
removing the component from the turbomachine;
placing the component on a support of an apparatus;
operating a multi-axis head of the apparatus to remove at least a trailing edge portion of the component by cutting the component with a jet of water discharged from a nozzle
mounted to the multi-axis head;
removing the component from the support;
welding the component to form a replacement section that replaces the trailing edge portion removed from the component;
placing the component on a workpiece holder of the apparatus; and then
operating the multi-axis head to form trailing edge cooling holes in the replacement section of the component by electrical-discharge machining the replacement section with an electrical-discharge electrode mounted to the multi-axis head, the electrical-discharge machining being performed while water is present as a dielectric medium between the replacement section and the electrical-discharge electrode.

11. The method according to claim 10, wherein the apparatus is a waterjet cutting apparatus and the method comprises modifying the multi-axis head of the apparatus to carry the electrical-discharge electrode in addition to the nozzle.

12. The method according to claim 11, wherein the modifying step comprises securing an adapter plate to the multi-axis head and then mounting the electrical-discharge electrode to the adapter plate.

13. The method according to claim 12, wherein as a result of the modifying step the nozzle and the electrical-discharge electrode are supported on oppositely-disposed sides of the multi-axis head.

14. The method according to claim 10, wherein the water is delivered to the component from a first tank positioned within a second tank containing the water for the nozzle, the first tank is removable from the second tank, and the first tank is absent from the second tank during cutting of the component with the jet of water discharged from the nozzle.

15. The method according to claim 10, wherein the step of operating the multi-axis head to remove the trailing edge portion of the component comprises controlling the movement of the multi-axis head so as to precisely position and move the nozzle relative to surface contours of the component, and the step of operating the multi-axis head to form the trailing edge cooling holes comprises controlling the movement of the multi-axis head so as to precisely position and move the electrical-discharge electrode relative to surface contours of the component.

16. The method according to claim 15, wherein the controlling steps are both performed by operating a single pendant control in communication with the apparatus.

17. The method according to claim 15, wherein at least the step of controlling the movement of the multi-axis head during forming of the trailing edge cooling holes is performed in reference to stored data that identify the surface contours of the component.

18. An apparatus for repairing a component with surface holes, the apparatus comprising:
means for supporting the component on the apparatus;
a multi-axis head adapted for movement relative to the component while supported on the apparatus;
a nozzle mounted to the multi-axis head and operable to remove at least a portion of the component with a jet of fluid discharged therefrom;
an electrical-discharge electrode mounted to the multi-axis head and operable to form surface holes in the component by electrical-discharge machining; and
means for controlling the movement of the multi-axis head, the controlling means being operable to position and move the nozzle relative to surface contours of the component when removing the portion of the component and to position and move the electrical-discharge electrode relative to surface contours of the component when forming the surface holes in the component.

19. The apparatus according to claim 18, wherein the apparatus is a fluid jet cutting apparatus and the multi-axis head is modified to carry the electrical-discharge electrode in addition to the nozzle.

20. The apparatus according to claim 19, further comprising an adapter plate secured to the multi-axis head and to which the electrical-discharge electrode is mounted.

21. The apparatus according to claim 18, wherein the nozzle and the electrical-discharge electrode are supported on oppositely-disposed sides of the multi-axis head.

22. The apparatus according to claim 18, further comprising:
means for providing a dielectric medium between the component and the electrical-discharge electrode;
a first tank from which the dielectric medium is delivered to the component; and
a second tank containing the fluid for the nozzle and in which the first tank is positioned.

23. The method according to claim 22, wherein the first tank is configured to be removable from the second tank so as to be absent from the second tank when removing the portion of the component with the jet of fluid discharged from the nozzle.

24. An apparatus for repairing an air-cooled airfoil component of a turbomachine, the apparatus comprising:

means for supporting the component on the apparatus;

a multi-axis head adapted for movement relative to the component while supported on the apparatus;

a nozzle mounted to the multi-axis head and operable to remove at least a trailing edge portion of the component with a jet of water discharged therefrom;

an electrical-discharge electrode mounted to the multi-axis head and operable to form trailing edge cooling holes in the component by electrical-discharge machining;

means for providing partially deionized water as a dielectric medium between the component and the electrical-discharge electrode while electrical-discharge machining is being performed; and means for controlling the movement of the multi-axis head, the controlling means being operable to position and move the nozzle relative to surface contours of the component when removing the trailing edge portion of the component and to precisely position and move the electrical-discharge electrode relative to surface contours of the component when forming the trailing edge cooling holes in the component.

25. The apparatus according to claim 24, wherein the apparatus is a waterjet cutting apparatus and the multi-axis head is modified to carry the electrical-discharge electrode in addition to the nozzle.

26. The apparatus according to claim 24, further comprising an adapter plate secured to the multi-axis head and to which the electrical-discharge electrode is mounted.

27. The apparatus according to claim 24, wherein the nozzle and the electrical-discharge electrode are supported on oppositely-disposed sides of the multi-axis head.

28. The apparatus according to claim 24, further comprising a first tank from which the partially deionized water is delivered to the component, and a second tank containing the water for the nozzle and in which the first tank is positioned, the first tank being configured to be removable from the second tank so as to be absent from the second tank when removing the trailing edge portion of the component with the jet of water discharged from the nozzle.

29. The apparatus according to claim 24, wherein the controlling means comprises a pendant control that is operable to control the movement of the multi-axis head when removing the trailing edge portion of the component and when forming the trailing edge cooling holes in the component.

30. The apparatus according to claim 24, further comprising means for storing data that identify the surface contours of the component.

* * * * *